Patented July 23, 1929.

1,721,814

UNITED STATES PATENT OFFICE.

KARL GEISEL, OF LEVALLOIS-PERRET, FRANCE, ASSIGNOR, BY MESNE ASSIGNMENTS, TO ALUMINUM SOLDER CORPORATION OF AMERICA, OF NEW YORK, N. Y., A CORPORATION OF DELAWARE.

SOLDERING COMPOSITION.

No Drawing. Application filed September 21, 1928. Serial No. 307,554.

My present invention relates to soldering compositions intended particularly for soldering castings of light metals, such as aluminum, duralumin, alpherium, and alpax. My improved soldering compositions may however be used for other metals as well. My invention is especially suitable for soldering castings such as aluminum crank cases of internal combustion engines for motor cars. The new soldering compositions produce joints of remarkable strength.

The new compositions consist of aluminum, zinc, and tin, in proportions which may be varied within certain limits, particularly for varying the temperature at which the soldering operation is to be performed.

Three typical and satisfactory compositions are as follows:

|  | I. | II. | III. |
|---|---|---|---|
| Aluminum | 4.00 | 4.33 | 15 |
| Zinc | 42.66 | 66.66 | 60 |
| Tin | 53.34 | 29.01 | 25 |
|  | 100.00 | 100.00 | 100 |

The parts are given by weight.

Composition I is intended particularly for "tinning" and requires a temperature of about 230 to 240° centigrade for its proper application. Composition II is the solder proper for connecting or uniting separate pieces of metal (whether of the same or of different metals), or different parts of the same pieces; the soldering temperature for composition II is about 260° centigrade. Composition III is intended particularly for soldering relatively heavy work, and requires a soldering temperature of about 400° centigrade.

The compositions are prepared by melting the three ingredients together in any suitable manner, and then casting the resulting mass or solder into bars, ribbons, strips, or any other suitable form.

The three examples given above indicate the use of aluminum within the range of from 4 to 15 per cent, zinc within the range of about 40 to 60 per cent, and tin within the range of about 55 to 25 per cent. It will be noted that as the percentage of aluminum is increased, that of tin is decreased.

Various modifications may be made without departing from the nature of my invention as set forth in the appended claim.

I claim:

A soldering composition consisting of about $4\frac{1}{3}\%$ (by weight) of aluminum, $66\frac{2}{3}\%$ of zinc, and 29% of tin, and having a soldering temperature of about 260° centigrade.

In testimony whereof I have hereunto set my hand.

KARL GEISEL.